(12) United States Patent     (10) Patent No.:   US 12,691,799 B2

Larrison     (45) Date of Patent:    Jul. 28, 2026

(54) CHILD RESTRAINT

(71) Applicant: Dorel Juvenile Group, Inc., Foxboro, MA (US)

(72) Inventor: Matthew R. Larrison, Columbus, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 179 days.

(21) Appl. No.: 18/514,026

(22) Filed: Nov. 20, 2023

(65) Prior Publication Data

US 2024/0166098 A1     May 23, 2024

Related U.S. Application Data

(60) Provisional application No. 63/384,263, filed on Nov. 18, 2022.

(51) Int. Cl.
    B60N 2/28       (2006.01)

(52) U.S. Cl.
    CPC ......... B60N 2/2806 (2013.01); B60N 2/2821 (2013.01); B60N 2/2869 (2013.01); B60N 2/2875 (2013.01)

(58) Field of Classification Search
    CPC .. B60N 2/2821; B60N 2/2887; B60N 2/2869; B60N 2/2806; B60N 2/2875
    USPC ................................ 297/4, 352, 256.16, 485
    See application file for complete search history.

(56) References Cited

U.S. PATENT DOCUMENTS

| | | | | |
|---|---|---|---|---|
| 4,621,589 A | * | 11/1986 | Thinnes ................. | B62B 3/144 |
| | | | | D34/27 |
| 5,031,960 A | * | 7/1991 | Day ....................... | B60N 2/286 |
| | | | | 297/256.13 |
| 5,377,386 A | * | 1/1995 | Griffith ................... | A45F 3/14 |
| | | | | 24/165 |
| 5,611,597 A | * | 3/1997 | Lanz ...................... | B62B 3/144 |
| | | | | 297/DIG. 6 |
| 5,884,967 A | * | 3/1999 | Gasper ................... | B60N 2/286 |
| | | | | 297/256.16 |
| 7,497,474 B2 | * | 3/2009 | Sanchez ................. | B60R 22/18 |
| | | | | 280/801.1 |
| 7,597,396 B2 | | 10/2009 | Longenecker | |
| 7,984,947 B2 | * | 7/2011 | Pos ....................... | B60N 2/2869 |
| | | | | 297/256.16 |
| 8,845,022 B2 | | 9/2014 | Strong | |
| 9,469,222 B2 | | 10/2016 | Williams | |
| 10,710,478 B2 | | 7/2020 | Reaves | |

(Continued)

FOREIGN PATENT DOCUMENTS

GB        2116837 A   *   10/1983   ........... B60N 2/2875

*Primary Examiner* — Milton Nelson, Jr.
(74) *Attorney, Agent, or Firm* — Barnes & Thornburg LLP

(57)          ABSTRACT

A child restraint includes a seat base adapted to be secured to a vehicle seat. The seat base includes a seat-base foundation formed to include a vehicle seatbelt path and a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat. The child restraint further includes a juvenile seat adapted to be secured to the seat base and a seat connection system configured to maintain connection between the juvenile seat and the seat base.

19 Claims, 7 Drawing Sheets

(56)  References Cited

U.S. PATENT DOCUMENTS

2012/0280540  A1*  11/2012  Pedraza  ............... B60N 2/2845
                                                            297/148
2021/0178938  A1    6/2021  Williams
2021/0237626  A1    8/2021  Longenecker
2021/0394653  A1   12/2021  Li

* cited by examiner

VEHICLE SEAT

CHILD RESTRAINT

PRIORITY CLAIM

This application claims priority under 35 U.S.C. § 119(e) to U.S. Provisional Patent Application No. 63/384,263, filed Nov. 18, 2022, which is expressly incorporated by reference herein in its entirety.

BACKGROUND

The present disclosure relates to child safety devices, and particularly to child seats. More particularly, the present disclosure relates to child seat for use in a vehicle.

SUMMARY

According to the present disclosure, a child restraint, in accordance with the present disclosure, includes a seat base adapted to be secured to a vehicle seat. The seat base includes a seat-base foundation formed to include a vehicle seatbelt path and a vehicle seatbelt retainer coupled to the seat-base foundation. The vehicle seatbelt retainer is configured to pivot between an opened or released position and a closed or clamped position. In the released position, the vehicle seatbelt retainer is spaced away from the vehicle seatbelt path. In the clamped position, the vehicle seatbelt retainer overlies the vehicle seatbelt path and clamps a vehicle seat belt to the seat-base foundation to secure the seat base to the vehicle seat.

In illustrative embodiments, the seat base further includes a seat-orientation controller coupled to the seat-base foundation. The seat-orientation controller is movable relative to the seat-base foundation and the vehicle seatbelt retainer. For example, the seat-orientation controller may be rotatable about a vertical rotation axis between a first position (i.e. a sideways orientation) in which the seat-orientation controller overlies the vehicle seatbelt retainer and blocks the vehicle seatbelt retainer from moving from the clamped position to the released position, and a second position (i.e. a forward-facing orientation or a rearward-facing orientation), in which the vehicle seatbelt retainer is exposed and is moveable between the clamped position and the released position.

In illustrative embodiments, the child restraint further includes a juvenile seat coupled to the seat base and configured to hold a child for transportation in a vehicle. In the illustrative embodiment, the juvenile seat is coupled directly to the seat-orientation controller for movement therewith relative to the seat-base foundation and to the vehicle seatbelt retainer. In other embodiments, the juvenile seat may be coupled directly to the seat-base foundation and the seat-orientation controller may be omitted.

In illustrative embodiments, the child restraint further includes a seat connection system configured to maintain connection between the juvenile seat and the seat-orientation controller or between the seat-base foundation and the juvenile seat. The juvenile seat is movable relative to the seat base between a use position and a base-installation position. In the use position, the juvenile seat is installed upright on the seat-orientation controller and can rotate about the vertical rotation axis with the seat-orientation controller. In the base-installation position, the juvenile seat is spaced apart from the seat base to provide clearance for the seatbelt retainer to move between the released position and the clamped position.

In illustrative embodiments, the seat connection system includes a connector cable configured to maintain connection between the juvenile seat and the seat base when the juvenile seat is in the base-installation position. In some embodiments, the tether extends between and interconnects the seat-orientation controller and the juvenile seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a child restraint including seat base and a juvenile seat adapted to be secured to the seat base, the seat base having a seat-base foundation configured to mount to a vehicle seat and a vehicle seatbelt retainer configured to move from a released or opened position to expose a belt path surface of the seat base foundation and a clamped or closed position to clamp a vehicle seatbelt to the seat-base foundation while the juvenile seat is at least partially separated from the seat base;

FIG. 2 is another perspective and diagrammatic view showing the juvenile seat moved to a base-installation position in which the juvenile seat is misaligned with the seat base to expose the vehicle seatbelt retainer and allow the vehicle seatbelt retainer to move between the released position and the clamped position and showing that the child restraint further includes a seat connection system including a connector cable that interconnects the seat base and the juvenile seat to block complete separation of the juvenile seat from the seat base so that the juvenile seat and the seat base remain connected as a unit when the juvenile seat is in the base-installation position;

FIG. 3 is an enlarged view of the seat connection system from FIG. 2 showing that the connector cable extends through a cable channel formed in a bottom of the juvenile seat and showing that the seat connection system further includes a first attachment configured to mount a first end of the connector cable to the seat base and a second attachment configured to mount an opposite, second end of the connector cable to the seat base;

Figure 7:
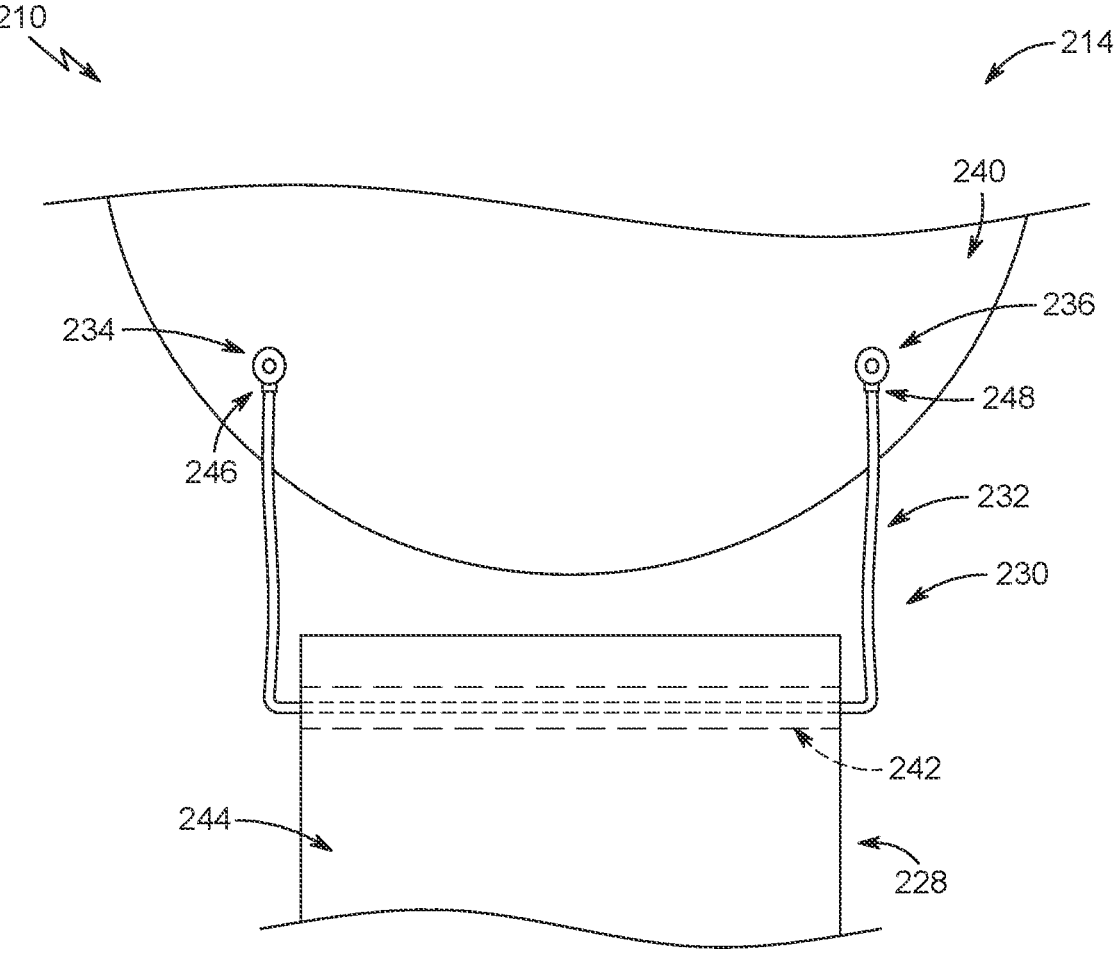
Figure 8:
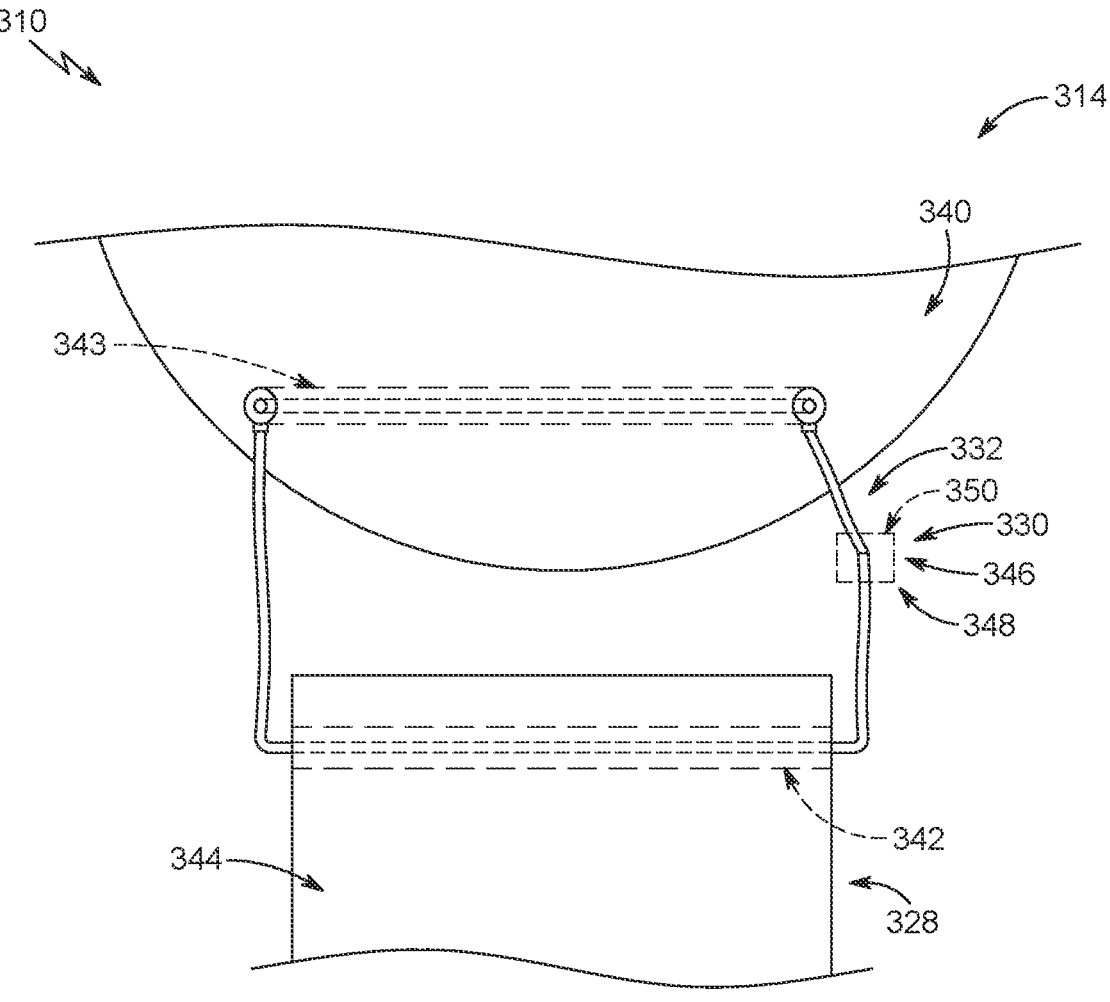

FIG. 7 is a diagrammatic view of another embodiment of a child restraint including a seat base, a juvenile seat detachable from the seat base, and a seat connection system configured to block complete separation of the juvenile seat from the seat base, and showing that the seat connection system includes a connector cable arranged to extend through a channel in the seat base, a first attachment configured to mount a first end of the connector cable to the juvenile seat, and a second attachment configured to mount a second end of the connector cable to the juvenile seat; and FIG. 8 is a diagrammatic view of another embodiment of a child restraint including a seat base, a juvenile seat detachable from the seat base, and a seat connection system configured to block complete separation of the juvenile seat from the seat base, and showing that the seat connection system includes a connector cable arranged to extend through a first channel formed in the seat base and a second channel formed in the juvenile seat.

DETAILED DESCRIPTION

Figure 1:
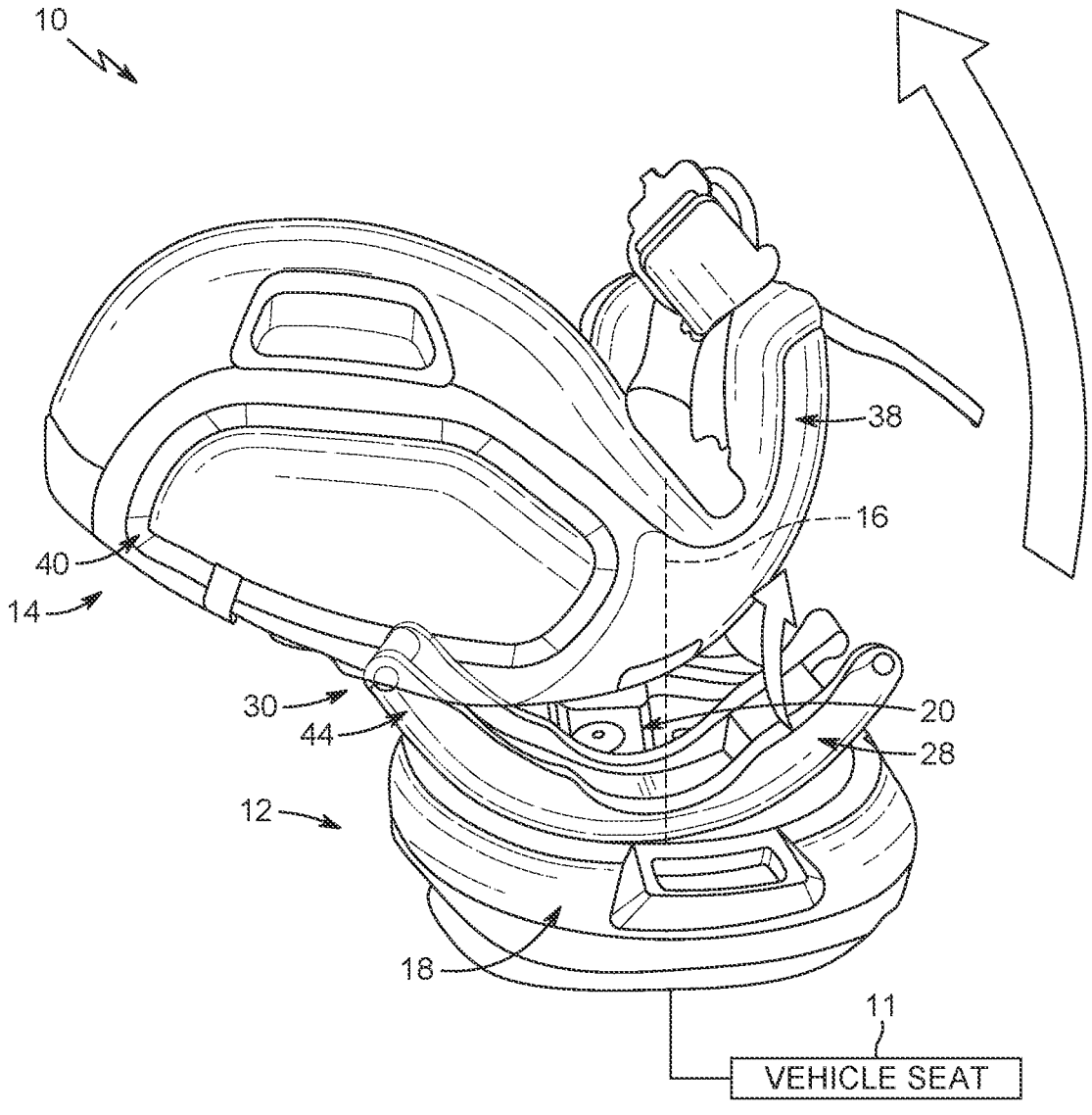

A child restraint 10 includes a seat base 12 adapted to rest on a vehicle seat 11 and a juvenile seat 14 coupled to the seat base 12 as shown in FIG. 1. The juvenile seat 14 is rotatable about a vertical rotation axis 16 to change the juvenile seat 14 from a forward facing orientation to a rearward facing orientation relative to the seat base 12. In some embodiments, the juvenile seat 14 is at least partially detachable from the seat base 12 so that the seat base 12 can be secured properly to the vehicle seat 11 prior to arrangement of the juvenile seat 14 in the forward facing orientation or the rearward facing orientation.

The seat base 12 includes a seat base foundation 18 and a vehicle seatbelt retainer 20 mounted to the seat base foundation 18 for pivotable movement about a retainer axis 22 between a released position and a clamped position. In the released position, a distal end of the vehicle seatbelt retainer 20 is spaced apart from the seat base foundation 18 to expose a vehicle seatbelt path 24. In the clamped position, the vehicle seatbelt retainer 20 overlies the vehicle seatbelt path 24 and is configured to clamp a vehicle seat belt between the vehicle seatbelt retainer 20 and the seat base foundation 18 to secure the seat base 12 to the vehicle seat 11.

Figure 2:
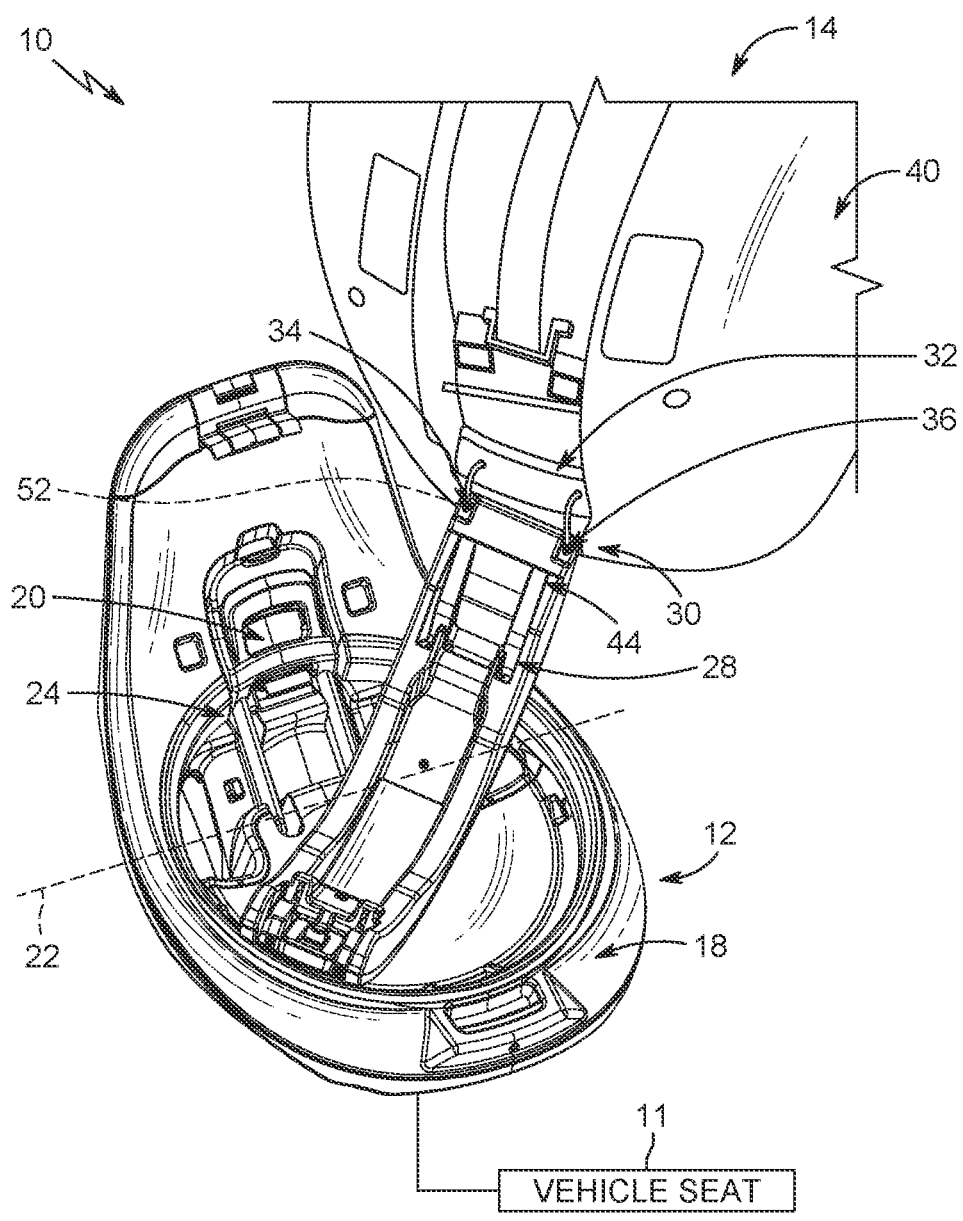
Figure 3:
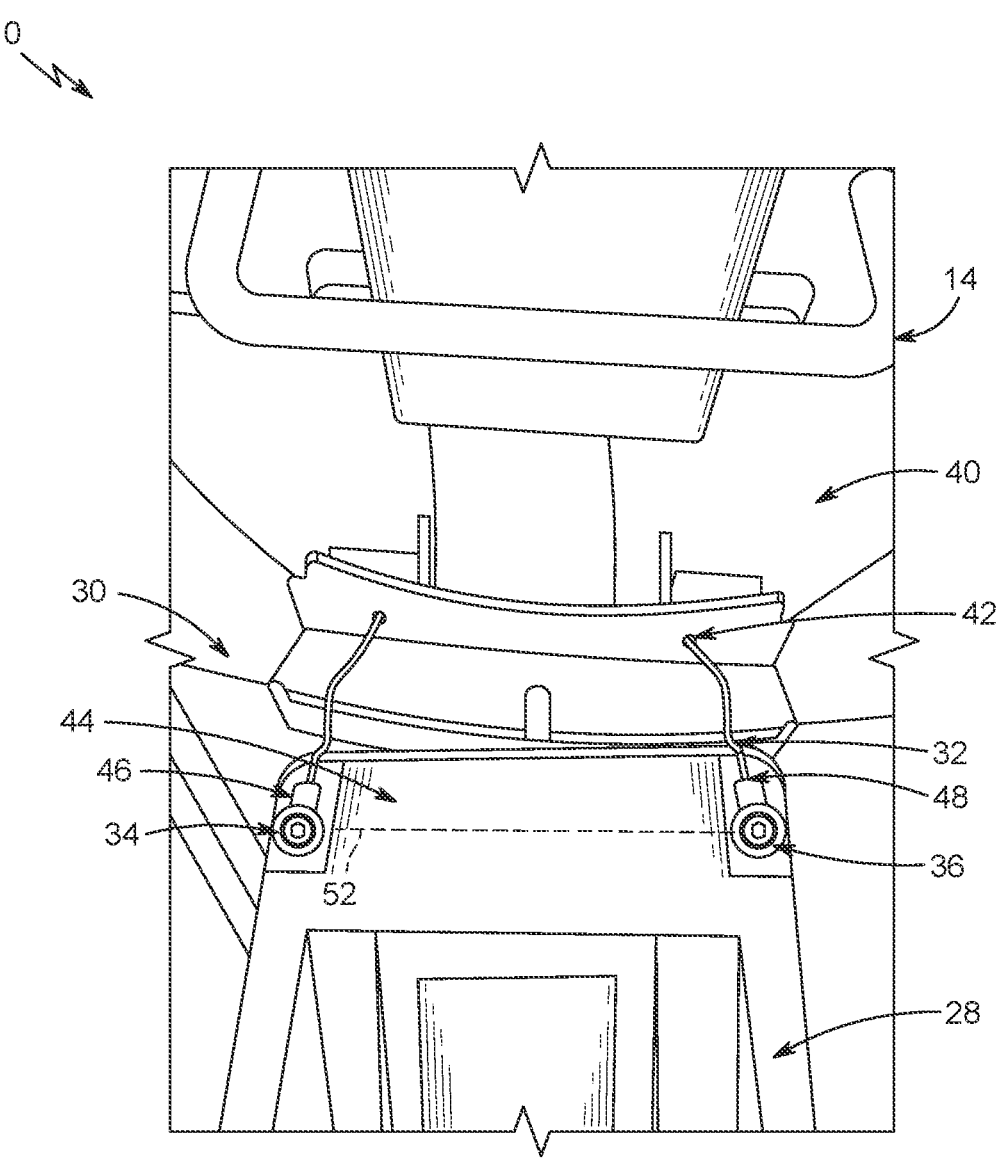
Figure 4:
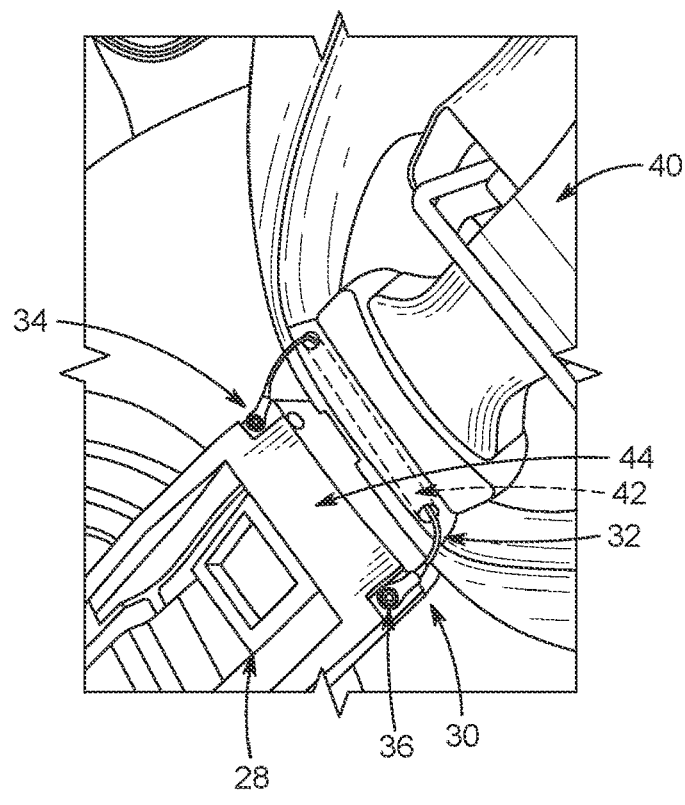
FIG. 4 is an enlarged perspective view of the connector system showing that the cable channel extends endlessly between two openings and showing the connector cable extending endlessly through the cable channel.
Figure 5:
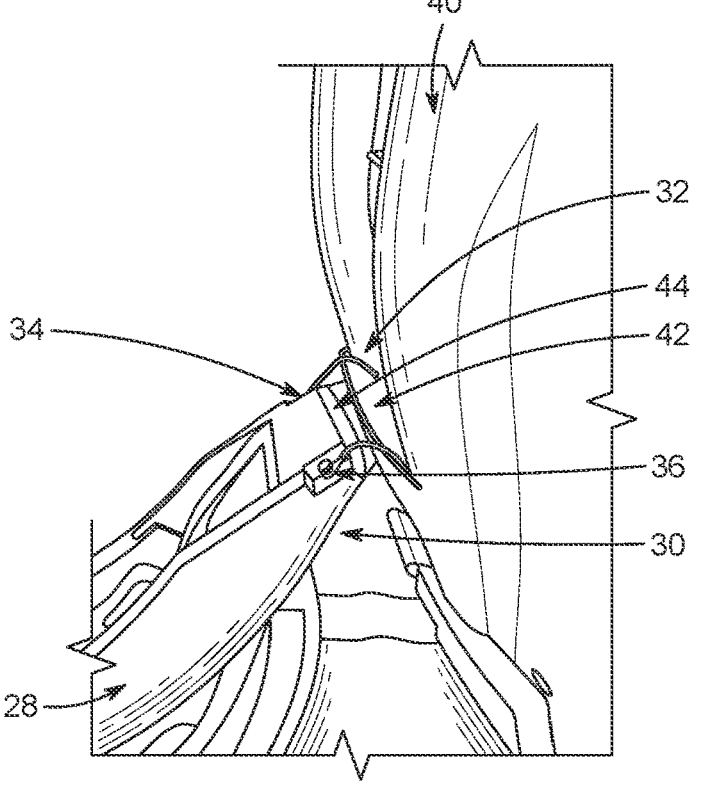
FIG. 5 is another perspective view showing that the connector cable is flexible to allow vertical movement of the juvenile seat relative to the seat base when the juvenile seat is detached from the seat base.
Figure 6:
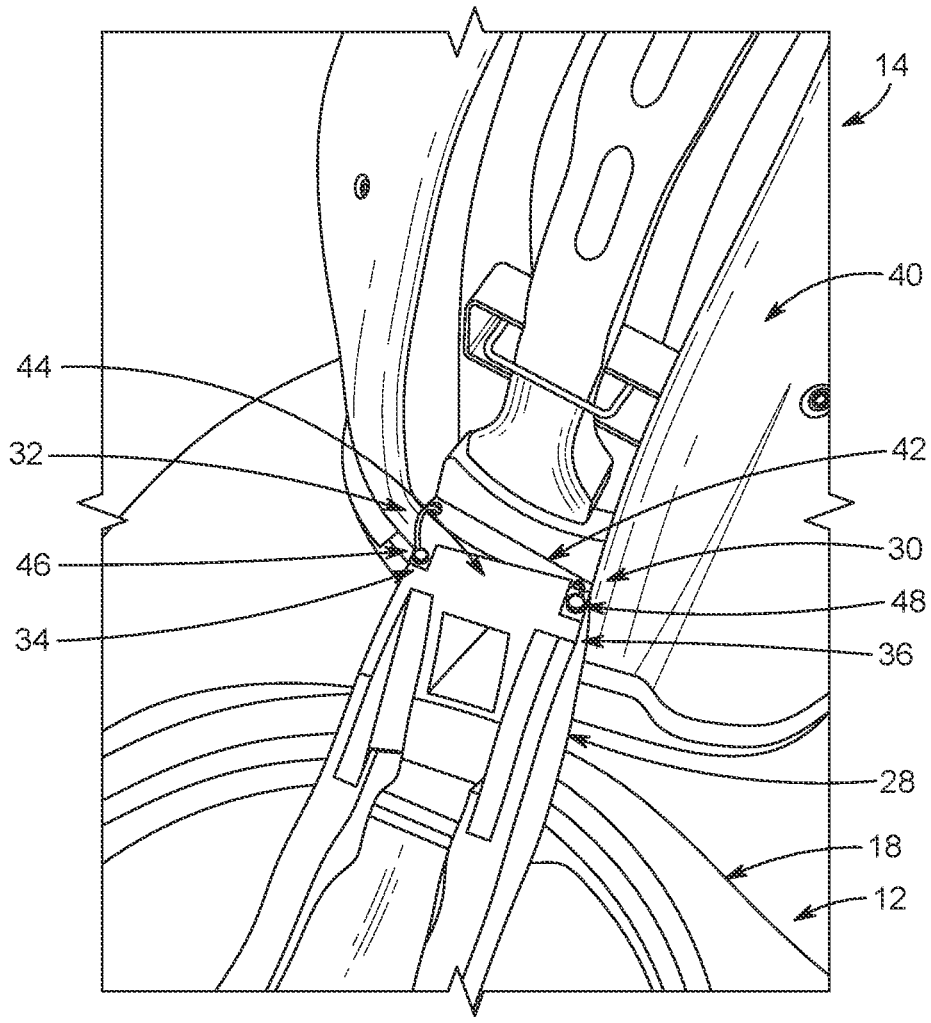
FIG. 6 is another perspective view showing that the juvenile seat is movable laterally relative to the seat base when the juvenile seat is detached from the seat base.

The seat base 12 may further include a seat-orientation controller 28 coupled to the seat base foundation 18 as shown in FIGS. 1 and 2. The seat-orientation controller 28 is configured to secure the juvenile seat 14 to the seat base 12 and allows selective rotation of the juvenile seat 14 relative to the seat base foundation 18 about the vertical rotation axis 16 with the juvenile seat 14. The seat-orientation controller 28 may also allow selective recline of the juvenile seat 14 relative to the seat base foundation 18. In some embodiments, the vehicle seatbelt retainer 20 may only be able to move from the clamped position to the release position when the juvenile seat 14 is at least partially detached from the seat-orientation controller 28. Reference is hereby made to U.S. patent application Ser. No. 18/377,079, filed Oct. 5, 2023, the disclosure of which is hereby incorporated herein in its entirety for the purpose of describing a vehicle seatbelt retainer and a seat-orientation controller.

The child restraint 10 in the illustrative embodiment further includes a connector system 30 configured to maintain connection between the seat base 12 and the juvenile seat 14 when the juvenile seat 14 is at least partially detached from the seat-orientation controller 28 as shown in FIGS. 1-6. The connector system 30 includes a connector cable 32, a first attachment 34, and a second attachment 36. The connector cable 32 is configured to maintain connection between the juvenile seat 14 and the seat-orientation controller 28 of the seat base 12. The connector cable 32 includes a first end 46 and a second end 48 opposite the first end 46 as shown in FIGS. 3-6. The first end 46 of the connector cable 32 is coupled to the first attachment 34 of the connector system 30. The second end 48 of the connector cable 32 is coupled to the second attachment 36 of the connector system 30. The juvenile seat 14 may initially be separated completely from the seat base 12 and subsequently retrofitted with the connector system 30 to block full separation of the juvenile seat 14 from the seat base 12.

The juvenile seat 14 includes a seat bottom 38 and a seat back 40 arranged to extend upwardly from the seat bottom 38 as shown in FIG. 1. The connector cable 32 extends through a cable channel 42 formed in the seat back 40 of the juvenile seat 14 as shown in FIGS. 3-6. The first attachment 34 and the second attachment 36 are coupled to an upper end 44 of the seat-orientation controller 28 to secure the connector cable 32 to the seat-orientation controller 28, and thus, secure the juvenile seat 14 to the seat-orientation controller 28 and the seat base 12. In one embodiment, the cable channel 42 is formed in the seat back 40 of the juvenile seat 14 as shown in FIGS. 3-6. In an alternative embodiment, the cable channel 42 is formed in the seat bottom 38 of the juvenile seat 14.

The first and second attachments 34, 36 of the connector system 30 are configured to join the first and second ends 46, 48 of the connector cable 32 with the seat-orientation controller 28 so that the juvenile seat 14 is secured to the seat base 12 as shown in FIGS. 2-6. In the illustrative embodiment, the first and second attachments 34 each include a ring terminal and a screw that passes through an opening formed in the ring terminal and into the seat-orientation controller 28 to couple the connector cable 32 to the seat-orientation controller 28. In some embodiments, the first and second attachments 34, 36 each include only a screw, for example, and the ends 46, 48 of the connector cable 32 are coupled directly to each respective screw. In some embodiments, the first and second attachments 34, 36 each include any other suitable attachment structure such as a bolt, a pin, a hook, a bar, etc. In some embodiments, the ends 46, 48 may be coupled directly to the seat-orientation controller 28 (i.e. by welding, soldering, brazing, molding, over molding, etc.) and the attachments 36, 38 are omitted.

The connector system 30 is configured to couple the juvenile seat 14 to the seat-orientation controller 28 and the seat base 12 for pivotable movement of the juvenile seat 14 between a secured position and an unsecured position as suggested by FIGS. 1-6. The juvenile seat 14 may be pivoted upwardly to the unsecured position by moving the seat bottom 38 in an upward direction. The juvenile seat 14 may be pivoted downwardly to the secured position by moving the seat bottom 38 in a downward direction. The connector system 30 enables a user to pivot the juvenile seat 14 relative to the seat base 12 with one hand after actuating a release handle on the juvenile seat 14.

In the illustrative embodiment, the connector cable 32 is a metallic cable that is not easily broken or cut by users as compared to plastic or fiber cables. The length of the connector cable 32 is sized to limit the amount of separation between the juvenile seat 14 and the upper end 44 of the seat-orientation controller 28. The length of the connector cable 32 provides enough separation between the juvenile seat 14 and the upper end 44 of the seat-orientation controller 28 so that the juvenile seat 14 may pivot relative to the seat base 12 while remaining in close proximity to the upper end 44 of the seat-orientation controller 28. Because the juvenile seat 14 remains in close proximity to the upper end 44 of the seat-orientation controller 28, the user may use one hand to pivot the juvenile seat 14 upwardly and downwardly relative to the seat base 12. The length of the connector cable 32 may be sized such that a pivot axis 52 is established. The juvenile seat may pivot about the axis 52 between the secured position and the unsecured position.

Another embodiment of a child restraint 210 is shown in FIG. 7. The child restraint 210 is substantially similar to the child restraint 10 except that a connector system 230 of the child restraint 210 is arranged differently than the connector system 30 of the child restraint 10. The connector system 230 includes a connector cable 232, a first attachment 234, and a second attachment 236. The connector cable 232 is configured to maintain connection between a juvenile seat 214 and a seat-orientation controller 228 which is similar to seat-orientation controller 28.

The connector cable 232 extends through a cable channel 242 formed in an upper end 244 of the seat-orientation controller 228. The first attachment 234 and the second attachment 236 are coupled to a seat back 240 of the juvenile seat 214 to secure the connector cable 232 to the juvenile seat 214, and thus, secure the juvenile seat 214 to the seat-orientation controller 228.

The connector cable 232 includes a first end 246 and a second end 248 opposite the first end 246. The first end 246 of the connector cable 232 is coupled to the first attachment 234 of the connector system 230. The second end 248 of the connector cable 232 is coupled to the second attachment 236 of the connector system 230.

The first and second attachments 234, 236 of the connector system 230 are configured to join the first and second ends 246, 248 of the connector cable 232 with the seat back 240 so that the juvenile seat 214 is secured to the seat-orientation controller 228. In the illustrative embodiment, the first and second attachments 234, 236 each include a ring terminal and a screw that passes through an opening formed in the ring terminal and into the seat back 240 to couple the connector cable 232 to the seat back 240. In some embodiments, the first and second attachments 234, 236 each include only a screw, for example, and the ends 246, 248 of the connector cable 232 are coupled directly to each respective screw. In some embodiments, the first and second attachments 234, 236 each include any other suitable attachment structure such as a bolt, a pin, a hook, a bar, etc. In some embodiments, the ends 246, 248 may be coupled directly to the seat back 240 (i.e. by welding, soldering, brazing, molding, over molding, etc.) and the attachments 236, 238 are omitted.

Another embodiment of a child restraint 310 is shown in FIG. 8. The child restraint 310 is substantially similar to the child restraint 10 except that a connector system 330 of the child restraint 310 differs from the connector system 30 of the child restraint 10. The connector system 330 comprises a connector cable 332 including a first end 346 and a second end 348 opposite the first end 346. The connector cable 332 is configured to maintain connection between a juvenile seat 314 and a seat-orientation controller 328.

The connector cable 332 extends through a first cable channel 342 formed in an upper end 344 of the seat-orientation controller 328 and a second cable channel 343 formed in a seat back 340 of the juvenile seat 314. The connector cable 332 forms a continuous loop to couple the juvenile seat 314 to the seat-orientation controller 328.

In one embodiment, the first end 346 and the second end 348 of the connector cable 332 are clamped together at a connection point by a crimped sleeve 350, for example. In another embodiment, the first end 346 and the second end 348 of the connector cable 332 are permanently joined together by welding, soldering, brazing, or any other suitable attachment means.

The invention claimed is:
1. A child restraint comprising
   a seat base adapted to be secured to a vehicle seat, the seat base comprising a seat-base foundation formed to include a vehicle seatbelt path, a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat, and a seat-orientation controller coupled to the seat-base foundation and movable relative to the seat-base foundation and the vehicle seatbelt retainer about a vertical rotation axis between a first position in which the seat-orientation controller overlies the vehicle seatbelt retainer and blocks the vehicle seatbelt retainer from moving from the clamped position to the released position, and a second position, in which the vehicle seatbelt retainer is exposed and is moveable between the clamped position and the released position,
   a juvenile seat coupled to the seat-orientation controller for movement therewith relative to the seat-base foundation and to the vehicle seatbelt retainer, and
   a seat connection system configured to maintain connection between the juvenile seat and the seat-orientation controller, the seat connection system including a connector cable interconnecting a rear end of the seat-orientation controller and a bottom of the juvenile seat,
   wherein the juvenile seat is separable from seat-orientation controller to change from a use position in which the juvenile seat is upright and installed on the seat-orientation controller to overlie the seat base and rotate about the vertical rotation axis with the seat-orientation controller, and a base-installation position, in which the juvenile seat is tilted away from the seat-orientation controller and spaced apart from the seat-orientation controller while still being connected to the connector cable and the seat-orientation controller is in the second position so that vehicle seatbelt retainer is free to pivot between the released position and the clamped position.
2. The child restraint of claim 1, wherein the seat connection system further includes a first attachment coupled to the rear end of the seat-orientation controller and a first end of the connector cable and a second attachment coupled to the rear end of the seat-orientation controller and an opposite second end of the connector cable.
3. The child restraint of claim 2, wherein the first and second attachments are spaced apart from each other and provide a pivot axis for the juvenile seat, and wherein the juvenile seat is movable relative to the pivot axis when the juvenile seat is detached from the seat-orientation controller.
4. The child restraint of claim 3, wherein the first and second attachments each include a fastener and a ring terminal formed to include an opening, and wherein the fastener of each attachment extends through the opening and into the rear end of the seat-orientation controller.
5. The child restraint of claim 1, wherein the connector cable is configured to extend endlessly through a cable channel formed in the juvenile seat.
6. The child restraint of claim 5, wherein the connector cable is configured to couple the juvenile seat to the seat-orientation controller for pivotable movement relative to the seat base between the use position and the base-installation position.
7. The child restraint of claim 6, wherein the connector cable is flexible to allow translation of the juvenile seat relative to the seat base as the juvenile seat pivots relative to the seat base.
8. The child restraint of claim 5, wherein the connector cable includes metallic materials.

9. The child restraint of claim 1, wherein the seat connection system further includes a first attachment coupled to the bottom of the juvenile seat and a first end of the connector cable and a second attachment coupled to the bottom of the juvenile seat and an opposite second end of the connector cable, wherein the first and second attachments are spaced apart from each other, and wherein the first and second attachments each include a fastener and a ring terminal formed to include an opening, and wherein the fastener of each attachment extends through the opening and into the bottom of the juvenile seat.

10. The child restraint of claim 1, wherein the juvenile seat is formed to include a first cable channel and the seat-orientation controller is formed to include a second cable channel and the connector cable forms a loop and extends through both the first cable channel and the second cable channel.

11. A child restraint comprising a seat base adapted to be secured to a vehicle seat and formed to include a vehicle seatbelt path, a juvenile seat configured to be installed on the seat base, and a seat connection system configured to maintain connection between the juvenile seat and the seat base, the seat connection system including a connector cable interconnecting the seat base and the juvenile seat, wherein the juvenile seat is separable from the seat base to change from a use position in which the juvenile seat is upright and installed on the seat base to overlie the seat base, and a base-installation position, in which the juvenile seat is tilted away from the seat base to be at least partially mis-aligned with the seat base while being connected to the connector cable, wherein the connector cable is configured to couple the juvenile seat to the seat base and establishes a pivot axis to couple the juvenile seat to the seat base for pivotable movement relative to the seat base about the pivot axis between the use position and the base-installation position.

12. The child restraint of claim 11, wherein the seat connection system further includes a first attachment coupled to the seat base and a first end of the connector cable and a second attachment coupled to the seat base and an opposite second end of the connector cable.

13. The child restraint of claim 12, wherein the first and second attachments are spaced apart from each other.

14. The child restraint of claim 13, wherein the first and second attachments each include a fastener and a ring terminal formed to include an opening, and wherein the fastener of each attachment extends through the opening and into the rear end of the seat base.

15. The child restraint of claim 11, wherein the connector cable is configured to extend endlessly through a cable channel formed in the juvenile seat.

16. The child restraint of claim 15, wherein the connector cable includes metallic materials.

17. The child restraint of claim 11, wherein the connector cable is flexible to allow translation of the juvenile seat relative to the seat base as the juvenile seat pivots relative to the seat base.

18. The child restraint of claim 11, wherein the juvenile seat is formed to include a first cable channel and the seat base is formed to include a second cable channel, and the connector cable forms a loop and extends through both the first cable channel and the second cable channel.

19. The child restraint of claim 11, wherein the seat connection system further includes a first attachment coupled to the bottom of the juvenile seat and a first end of the connector cable and a second attachment coupled to the bottom of the juvenile seat and an opposite second end of the connector cable, wherein the first and second attachments are spaced apart from each other, and wherein the first and second attachments each include a fastener and a ring terminal formed to include an opening, and wherein the fastener of each attachment extends through the opening and into the bottom of the juvenile seat while the connector cable extends through a channel formed in the seat base.

* * * * *